United States Patent
Spalka et al.

(10) Patent No.: US 9,350,544 B2
(45) Date of Patent: *May 24, 2016

(54) APPARATUS FOR ENCRYPTING DATA

(71) Applicant: COMPUGROUP MEDICAL AG, Koblenz (DE)

(72) Inventors: Adrian Spalka, Koblenz (DE); Jan Lehnhardt, Koblenz (DE)

(73) Assignee: COMPUGROUP MEDICAL AG, Koblenz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,046

(22) Filed: Mar. 4, 2014

(65) Prior Publication Data

US 2014/0205086 A1  Jul. 24, 2014

Related U.S. Application Data

(63) Continuation of application No. 12/881,370, filed on Sep. 14, 2010, now Pat. No. 8,675,864.

(51) Int. Cl.
H04L 29/06 (2006.01)
H04L 1/00 (2006.01)
H04L 9/14 (2006.01)
H04L 9/06 (2006.01)

(52) U.S. Cl.
CPC ............... H04L 9/14 (2013.01); H04L 9/0631 (2013.01); H04L 9/0662 (2013.01)

(58) Field of Classification Search
None
See application file for complete search history.

(56) References Cited

U.S. PATENT DOCUMENTS

| 4,683,963 | A  | * | 8/1987 | Skinner | B01D 5/0027 175/206 |
| 4,864,616 | A  | * | 9/1989 | Pond et al. | 713/165 |
| 5,774,544 | A  | * | 6/1998 | Lee | G06F 11/006 380/277 |
| 6,243,470 | B1 | * | 6/2001 | Coppersmith | H04L 9/0625 380/259 |
| 6,249,582 | B1 | * | 6/2001 | Gilley | H04L 9/12 380/262 |
| 6,891,952 | B1 |   | 5/2005 | Peuhlhoefer et al. | |
| 6,904,150 | B1 |   | 6/2005 | Dent | |
| 7,502,469 | B2 |   | 3/2009 | Antoine | |

(Continued)

FOREIGN PATENT DOCUMENTS

DE  10206065  8/2003
DE  102004006570  9/2005

(Continued)

OTHER PUBLICATIONS

Guinee, R., et al., "A Novel True Random Binary Sequence Generator Based on a Chaotic Double Scroll Oscillator Combination with a Pseudo Random Generator for Cryptographic Applications," 2009, IEEE International Conference for Internet Technology and Secured Transactions; Nov. 9-12, 2009; ISBN: 978-1-4244-5647; 6 pages.

(Continued)

*Primary Examiner* — Abu Sholeman
*Assistant Examiner* — Maung Lwin

(57) ABSTRACT

An apparatus for encrypting data is provided. The apparatus is capable of symmetrically encrypting data and then encrypting the symmetrically encrypted data with the aid of a bit string. The bit string has a maximum entropy. Encryption of the symmetrically encrypted data is designed such that a section of the bit string is used for encryption and successive encryption operations are carried out with carrying sections of the bit string while the bit string remains unchanged.

3 Claims, 7 Drawing Sheets

(56) References Cited

U.S. PATENT DOCUMENTS

| | | | |
|---|---|---|---|
| 7,548,621 B1* | 6/2009 | Smith et al. | 380/277 |
| 7,590,866 B2* | 9/2009 | Hurtado | G06F 21/10 380/201 |
| 2004/0131181 A1* | 7/2004 | Rhoads | 380/37 |
| 2005/0081031 A1* | 4/2005 | Peterson | G06F 21/6218 713/165 |
| 2005/0169464 A1* | 8/2005 | Sannino | H04L 9/3073 380/30 |
| 2005/0268094 A1* | 12/2005 | Kohan | G06F 19/322 713/165 |
| 2006/0034456 A1 | 2/2006 | McGough | |
| 2006/0041762 A1* | 2/2006 | Ma | H04L 9/002 713/189 |
| 2006/0056620 A1* | 3/2006 | Shingal | H04L 9/065 380/28 |
| 2006/0104440 A1* | 5/2006 | Durand | H04L 29/06027 380/44 |
| 2006/0177065 A1* | 8/2006 | Halbert | 380/277 |
| 2007/0156587 A1* | 7/2007 | Yu et al. | 705/50 |
| 2007/0165864 A1 | 7/2007 | Nagase et al. | |
| 2008/0040603 A1 | 2/2008 | Stedron | |
| 2008/0044011 A1* | 2/2008 | Yoshida et al. | 380/28 |
| 2008/0101414 A1* | 5/2008 | Zhang | H04H 60/23 370/476 |
| 2008/0247540 A1 | 10/2008 | Ahn et al. | |
| 2009/0210724 A1 | 8/2009 | Hori | |
| 2009/0316901 A1* | 12/2009 | Hayashi | H04L 9/0858 380/267 |
| 2010/0017615 A1* | 1/2010 | Boesgaard Sorensen | G06F 21/55 713/176 |
| 2012/0045053 A1* | 2/2012 | Qi | G06F 7/588 380/252 |

FOREIGN PATENT DOCUMENTS

| | | |
|---|---|---|
| EP | 1152567 | 11/2001 |
| EP | 1411514 | 4/2004 |

OTHER PUBLICATIONS

Nadehara, K. et al., "Extended Instructions for the AES Cryptography and their Efficient Implementation," 2004, IEEE Workshop on Signal Processing Systems, Oct. 13-15, 2004; ISBN: 0-7803-8504-7; pp. 152-157.

* cited by examiner

APPARATUS FOR ENCRYPTING DATA

CROSS-REFERENCE TO RELATED APPLICATION

The present application is a continuation of co-pending U.S. patent application Ser. No. 12/881,370, entitled "Apparatus for Encrypting Data," filed on Sep. 14, 2010, the entirety of which is herein incorporated by reference.

FIELD OF THE INVENTION

The invention relates to an apparatus for encrypting data.

BACKGROUND OF THE INVENTION

Confidential data are usually encrypted if they are intended to be transmitted via an untrustworthy transmission medium.

Various encryption apparatuses are known from the prior art. The Advanced Encryption Standard (AES) is a symmetrical cryptosystem whose algorithm is freely available. The key used for AES encryption must be available to the recipient of the data in order to be able to decrypt the data.

AES is considered to be secure nowadays; on account of the developments in the field of encryption techniques, it can be assumed that, in approximately 30 years, data encrypted with AES will be able to be decrypted by unauthorized persons who do not have the required key.

When transmitting the data via a transmission medium, for example the Internet, data pass through a plurality of nodes before they arrive at the recipient. A node can have a long-term memory and can store forwarded messages. For confidential messages which have been encrypted, this means that they cannot be directly decrypted by unauthorized persons; however, it is not possible to guarantee that the data will not be able to be decrypted by unauthorized persons even after a relatively long period of time, for example in 30 years.

BRIEF SUMMARY OF THE INVENTION

In contrast, the present invention is based on the object of providing an improved apparatus for encrypting data.

The objects on which the invention is based are achieved with the features of the independent patent claim. Embodiments of the invention are given in the dependent patent claims.

The invention provides an apparatus which makes it possible to encrypt data in a more secure manner than is possible with the conventional known encryption technologies. For this purpose, the apparatus has means for symmetrically encrypting data. These may be, for example, means for encrypting data according to the Advanced Encryption Standard (AES). They are preferably a multiplicity of bit strings $A_{i,j}$ with associated pointers $a_j$. The apparatus also has means for encrypting symmetrically encrypted data with the aid of a bit string which has maximum entropy. Maximum entropy means maximum randomness of a bit string, for example. This means that the bit string cannot be compressed. This is advantageous since, in the case of the encryption with a bit string having maximum entropy, the encryption is more secure than encryption with a bit string having lower entropy. The encryption with the aid of the bit string having maximum entropy is preferably encryption according to the XOR method (Exclusive OR). In this case, a key obtained from the bit string and the data to be encrypted are used as an input for the XOR operation. The output is the encrypted message. In the case of an XOR operation, the output is 1 for an input of a 1 and a 0, for example, while the output is 0 for the input of two identical bits (1, 1; 0, 0). A message encrypted in this manner is again decrypted according to the XOR method using the same key.

The AES method is preferably used for symmetrical encryption. However, any other encryption method can also be used.

According to embodiments of the invention, the bit string having maximum entropy is formed in such a manner that a section of the bit string is used for encryption. The size of the used section of the bit string preferably corresponds to the volume of symmetrically encrypted data to be encrypted, with the result that one bit in the bit string is used for each bit to be encrypted. For successive encryption, the apparatus uses varying sections of the bit string. The bit string preferably remains unchanged. This means that at least one part of the used sections of the bit string is the same for at least two different encryption operations. This is advantageous since the bit string is not used up in this manner and can be used for encryption infinitely often. As an alternative, the bit string is used up. This means that an apparatus according to the invention uses a section of the bit string only once for encryption. When every section of the bit string has been used, the bit string is used up and is no longer used for encryption operations.

According to embodiments of the invention, the apparatus has means for communicating via a transmission medium. This is advantageous since a plurality of apparatuses can be connected to one another via the transmission medium. The transmission medium is preferably a network, for example the Internet.

According to embodiments of the invention, the apparatus has means for decrypting data, which have been encrypted with the aid of the bit string having maximum entropy, and means for decrypting symmetrically encrypted data. In this case, the data which have been encrypted with the aid of the bit string are decrypted using the same bit string. The data are preferably decrypted according to the XOR method with the aid of the bit string.

If a plurality of the apparatuses described above are in a network, it is possible to send confidential data in a secure manner with respect to decryption by unauthorized persons via the non-secure network by said data first of all being symmetrically encrypted by the apparatus and then being encrypted again with the aid of the bit string having maximum entropy. These are therefore double-encrypted data which have first been symmetrically encrypted; the symmetrically encrypted data are then encrypted once again by the apparatus with the aid of the bit string having maximum entropy. This is preferably carried out according to the XOR method. The double-encrypted data can be transmitted to another apparatus via the untrustworthy network. If the data are stored by a node in the network, even though said node cannot decrypt the data, future decryption is also impossible. As a result of the fact that the data are first of all encrypted by the apparatus according to the Advanced Encryption Standard, they already have a higher degree of entropy than the original message. These data which have already been encrypted and have the increased degree of entropy are now again encrypted with the aid of the bit string having maximum entropy. This encryption is carried out using an eXclusive OR (XOR) operation. The XOR operation gains entropy. The encryption of a message N of the length l with the aid of the bit string R, from which a key is obtained, according to the XOR method takes place according to the following formula:

$$C = N \oplus R[r:r+l-1]$$

The key is obtained from R by using an interval of the length l of R as the key. The interval begins at the position r and ends at the position r+l−1. The result of the encryption, the cipher C, likewise has the length l since one bit of the message N and one bit of the key were respectively used as the input for the XOR operation (⊕) which provided one bit of the cipher C as the output.

The data encrypted using the XOR method are then sent through the transmission medium, in which case the recipient must be informed of the position r in the bit string R at which the key begins. The length of the key l results from the length of the cipher C. The message recipient can decrypt the message again with the aid of the XOR method:

$$N = C \oplus R[r:r+l-1]$$

The bits of the cipher C and the key are now used as the input for the XOR operation. Precisely in the manner described above for encryption, the key is obtained in this case from the bit string R. The associated bit of the message N results as the output of the XOR operation. The recipient now thus has the decrypted message N and can read and use said message further.

The advantage of the XOR method is that the cipher C cannot be decrypted without the bit string R, which is theoretically proven. If the bit string R is used repeatedly, decryption by unauthorized persons without the bit string R is no longer precluded. However, since sections of the bit string R which always vary are used according to the invention for encryption and decryption operations, it is unlikely that a section of R is used particularly frequently. In addition, security is increased by virtue of the fact that a message which is written in plain text and has a low degree of entropy is not encrypted but rather a message which has already been symmetrically encrypted, for example according to the Advanced Encryption Standard, and has an increased degree of entropy.

In order to operate a plurality of apparatuses according to the invention in a network, it is thus necessary for all apparatuses to have the bit string having maximum entropy R. Otherwise, it would not be possible to decrypt a message encrypted by an apparatus according to the invention. Furthermore, each apparatus according to the invention in the network has a multiplicity of bit strings $A_{i,j}$ which are used for symmetrical encryption. So that subscribers for whom the data are not intended cannot decrypt the data, it is advantageous if each subscriber has as many bit strings $A_{i,j}$ as there are communication partners for the data interchange encrypted according to the invention in the network. Each apparatus in the network thus has a first set of data having at least the bit string R. The first set of data preferably also has n−1 bit strings $A_{i,j}$ in the case of n apparatuses according to the invention which interchange encrypted data with one another via a network. In this case, the i denotes the ith apparatus according to the invention in the network and the j denotes the jth apparatus according to the invention in the network. An apparatus according to the invention i thus has n−1 bit strings $A_{i,j}$. One bit string $A_{i,j}$ for symmetrical encryption is thus available to each potential communication partner for encryption according to the invention. A different bit string $A_{i,j}$ is used for each communication partner so that communication partners for whom the data are not intended cannot decrypt the data. In order to ensure that the message encrypted by the apparatus according to the invention i can be decrypted, it is advantageous if $A_{i,j}$ is equal to $A_{j,i}$.

According to embodiments of the invention, the apparatus has a memory and is designed to twice-encrypt data according to the invention, to store the data in the memory and to decrypt the data again if necessary. An additional bit string $A_{j,i}$ and an associated pointer $a_i$ for symmetrical encryption are used for this purpose, for example. One embodiment of the invention therefore has n bit strings $A_{i,j}$ and n pointers $a_j$ if the apparatus is designed to store twice-encrypted data. The pointer $r_i$ used for the XOR encryption must also be stored with the twice-encrypted message since said pointer is required for decryption and can be changed for other encryption operations.

Each apparatus according to the invention could decrypt the external encryption using the bit string R since the key R is available to all communication partners. However, the message which is then also symmetrically encrypted cannot be decrypted by a communication partner for whom the message is not intended.

The symmetrical encryption with the aid of the bit strings $A_{i,j}$ is preferably carried out using a pointer $a_j$, where j is the apparatus according to the invention which is intended to receive the message and i is the apparatus according to the invention which encrypts the message. It is thus advantageous if each apparatus according to the invention has n−1 pointers a in addition to the bit strings $A_{i,j}$. The symmetrical encryption is preferably carried out with the aid of the bit string $A_{i,j}$, and the pointer $a_j$ using an AES key s. The AES key s is calculated from the bit string $A_{i,j}$ and the pointer $a_j$ according to the following formula:

$$s = A_{i,j}[a_j : a_j + x - 1]$$

where x is the length of the key. A key length x of 256 bits is usually used for symmetrical AES encryption. The key s thus consists of an interval of the bit string $A_{i,j}$. The pointer $a_j$ is then shifted:

$$a_j = a_j + x$$

The pointer $a_j$ now thus points to the bit which was the first to be no longer used to form the key. An AES initialization vector v is then calculated according to the following formula:

$$v = A_{i,j}\left[a_j : a_j + \frac{x}{2} - 1\right]$$

The interval of the bit string $A_{i,j}$ from which the initialization vector v is formed thus begins at the place to which the shifted pointer $a_j$ points. The initialization vector v thus consists of an interval of the bit string $A_{i,j}$ which directly adjoins the interval from which the key s was formed. The length of the initialization vector is usually half the length x of the key.

At the beginning, the pointer $a_j$ thus points to a particular place in the bit string $A_{i,j}$ at which the key begins. The length x of the key s is predetermined, with the result that the communication partner j who receives the data knows from the outset how long the key is from the place to which the pointer points. The initialization vector v is usually half as long as the length of the key s and is likewise calculated from the bit string $A_{i,j}$ and the pointer $a_j$ which was shifted after the formation of the key.

According to embodiments of the invention, the means for encrypting the symmetrically encrypted data with the aid of the bit string have a pointer, the pointer being designed in such a manner that that section of the bit string which is used for encryption begins where the pointer points. Each apparatus according to the invention i thus preferably has a pointer $r_i$ which is used as a pointer for the bit string R. The pointer $r_i$ thus points to that place in R at which the key which is needed to decrypt the data begins. According to embodiments of the invention, a message M is encrypted using the bit strings $A_{i,j}$, R and the pointers $a_j$, $r_i$ according to the following principle:

The apparatus according to the invention i has a message M which is intended to be transmitted to the apparatus according to the invention j in a manner encrypted according to the invention. According to the invention, the message M is first of all symmetrically encrypted. This is preferably effected using an AES key s. This key is calculated from the bit string $A_{i,j}$ and the pointer $a_j$ according to the following formula:

$$s = A_{i,j}\lfloor a_j : a_j + x - 1 \rfloor$$

The pointer $a_j$ is then shifted:

$$a_j = a_j + x$$

Furthermore, successful encryption and decryption requires an AES initialization vector v which is calculated from the bit string $A_{i,j}$ and the pointer $a_j$ according to the following formula:

$$v = A_{i,j}\left[a_j : a_j + \frac{x}{2} - 1\right]$$

The apparatus according to the invention i now has an AES key s and an associated AES initialization vector v. The message M is symmetrically encrypted using these two parameters according to the Advanced Encryption Standard, for example using a 256-bit key:

$$C' = AES\text{-}256(M, s, v)$$

C' thus denotes the message M symmetrically encrypted using the key s and the initialization vector v. The symmetrically encrypted message C' of the length l is then encrypted again with the aid of the bit string R and the pointer $r_i$. This encryption is carried out according to the XOR method. The further encryption using R ensures that the message cannot be decrypted by unauthorized persons even after a relatively long period of time.

Even if it were possible, for example in 30 years, to decrypt an AES-encrypted message without having the key, it would be far more difficult, if not even impossible, for an unauthorized person to decrypt the encryption according to the XOR method. The symmetrically encrypted cipher C' is encrypted by the apparatus according to the invention i as follows:

$$C = C' \oplus R[r_i : r_i + l - 1]$$

C is the now double-encrypted message which is intended to be transmitted to the recipient according to the invention j, and l is the length of the cipher C', which is synonymous with the required key length and the length of the cipher C. The key consists of a section of the bit string R and has the length l. The key begins at the place to which the pointer $r_i$ points. The double-encrypted cipher C can now be transmitted to the apparatus according to the invention j via the untrustworthy transmission medium. So that the apparatus according to the invention j can decrypt the cipher C, i likewise transmits, to j, the two pointers $r_i$ and the value of $a_j$ before obtaining the key s and the initialization vector v: $a_j - x$. The bit strings $A_{i,j}$ and R are already present in the apparatus according to the invention j.

The double-encrypted cipher C is decrypted in the apparatus according to the invention j. The key for decrypting the message C is first of all calculated according to the XOR method with the aid of the bit string R and the pointer $r_i$ received from i:

$$M = C \oplus R[r_i : r_i + l - 1]$$

The length l is known since it must correspond to the length of the cipher C. The symmetrically encrypted cipher C' is the result of decryption according to the XOR method and is decrypted using the AES method. The key for the AES method and the vector are calculated from the bit string $A_{i,j}$ and the pointer $a_j$ which was transmitted from the apparatus according to the invention i to the apparatus according to the invention j:

$$s = A_{i,j}\lfloor a_j : a_j + x - 1 \rfloor$$

The pointer as is then shifted:

$$a_j = a_j + x$$

and the initialization vector v is obtained:

$$v = A_{i,j}\left[a_j : a_j + \frac{x}{2} - 1\right]$$

M can now be obtained from s, v and C' according to the AES method:

$$M = AES\text{-}256(C', s, v)$$

The unencrypted message M is now present in the apparatus according to the invention j.

Other keys must be used for subsequent encryption operations so that the security level remains at the same high level. The pointers $a_j$ and $r_i$ must therefore be changed so that other sections of the bit strings $A_{i,j}$ and R are used to calculate the keys. They are each set to that bit in the bit string which was the first to no longer be used to obtain the key s and the initialization vector v.

According to embodiments of the invention, the bit string $A_{i,j}$ is used up piece by piece, that is to say a section is used only once. The bit string R is likewise gradually used up by each apparatus according to the invention. A piece of R is thus used a maximum of n times, where n denotes the number of communication partners in a transmission medium, for example a network. However, the pointers $r_i$ to R point to a different place for each communication partner, with the result that it is unlikely that two different communication partners will form the same key from R. Each section of R is used a maximum of n times for encryption, once by each communication partner, in which case there are n communication partners in the transmission medium. Alternatively, the bit string R can be configured in such a manner that it is not used up.

If it is no longer possible to obtain a key from the bit string R since each section of R is used for encryption only once by an apparatus according to the invention and such a large part of R has already been used that enough bits for obtaining the key are no longer available, the device outputs, according to embodiments of the invention, a message stating that a new bit string R is required. The same procedure is provided for the bit strings $A_{i,j}$ in embodiments of the invention.

If the bit string R is alternatively designed in such a manner that it is possible to repeatedly use a section of R to obtain a plurality of keys, the pointer $r_i$ is set to the start of the bit string again when the end of the bit string R of the length L is reached. This is mathematically possible by using modulo, for example:

$$r_i = (r_i + l) \bmod L$$

If, in the case of a bit string R comprising 100 bits, the pointer $r_i$, for example, points to the bit number 93 and is intended to be advanced by 20 bits, one embodiment of the apparatus carries out the above mathematical operation, where $r_i+1=93+20=113$ and 113 mod 110=13. Therefore, $r_i$ then points to the 13th bit of R.

According to embodiments of the invention, the apparatus has a data storage medium and a computer. The computer has a first processor for executing a first program for encrypting data and a first interface for communicating with the data storage medium. The data storage medium has at least one first set of data having at least one bit string which is used for the XOR encryption. The data storage medium may be, for example, a USB stick or a hard disk or another storage medium. The first set of data is preferably transmitted from a trustworthy location to the data storage medium. This cannot be effected in unencrypted form via an untrustworthy transmission medium since otherwise the pointers and bit strings used for encryption can be read by unauthorized persons.

According to embodiments of the invention, the data storage medium has a second processor for executing a second program for encrypting data. The data storage medium also has a second interface for communicating with the computer and is designed to be externally connected to the computer via the second interface. The second program is preferably designed to symmetrically encrypt the first set of data and to transmit the symmetrically encrypted first set of data to the computer via the second interface. The first program in the computer is designed to receive the symmetrically encrypted first set of data via the first interface, to store said set of data in a memory and to decrypt said set of data. The first set of data preferably comprises the bit strings R and $A_{i,j}$ as well as the pointers $r_i$ and $a_j$. The computer preferably contains a memory having at least one second set of data. This second set of data may be, for example, a message which is intended to be transmitted to a communication partner j. For this purpose, the first program symmetrically encrypts the second set of data with the aid of the first set of data. This is effected, for example, according to the AES method, where the key s is formed from the bit string $A_{i,j}$ and the pointer $a_j$. The first program then encrypts the symmetrically encrypted second set of data with the aid of the bit string R and the pointer $r_i$ according to the XOR method.

According to embodiments of the invention, the computer has a third interface which is designed to receive a third set of data which is symmetrically encrypted and is encrypted according to the XOR method. The third set of data may be, for example, a message encrypted by a communication partner with the aid of an apparatus according to the invention. The first program is preferably designed to decrypt the third set of data. This is effected, for example, using the bit string R, the pointer $r_i$, the bit string $A_{i,j}$ and the pointer $a_j$.

According to embodiments of the invention, the apparatus has a random number generator with means for generating the first set of data and means for transmitting the first set of data. The random number generator is preferably a hardware random number generator. This is advantageous since a hardware random number generator generates bit strings having maximum entropy. The random data are preferably generated from a physical process, for example radioactive decay, thermal noise or other physical quantum effects. A bit string generated in this manner has maximum entropy since it is impossible to predict randomly occurring quantum effects.

According to embodiments of the invention, the apparatus has a second computer with means for receiving the first set of data from the random number generator and means for transmitting the data to the data storage medium. The second computer is preferably a computer at an absolutely secure location in order to ensure security. The second computer is needed to transmit data from the random number generator to the data storage medium. This is necessary if an apparatus according to the invention is intended to be provided with the bit strings $A_{i,j}$ and R and the pointers $a_j$ and $r_i$. This may be the case if an apparatus is newly set up, if the bit strings $A_{i,j}$ or R have been used up or if a further communication partner is intended to be added to an existing set of communication partners.

In another aspect, the invention relates to a computer program product, in particular a digital storage medium, for encrypted communication via a transmission medium. The computer program has executable program instructions for carrying out the following steps: reading a second set of data from a memory, symmetrically encrypting the second set of data with the aid of a first set of data from the memory, encrypting the symmetrically encrypted second set of data with the aid of a bit string according to the XOR method.

The bit string which is used for encryption according to the XOR method has maximum entropy. Only one section of the bit string is used to generate a key. Varying sections of the bit string are used for successive encryption operations. The twice-encrypted second set of data is transmitted to a recipient via a transmission medium.

According to embodiments of the invention, it is possible to use a bit string R, in which each section is used only once for encryption, for encryption according to the XOR method. This increases the standard of security. Alternatively, the bit string R may be configured in such a manner that parts of the sections used for encryption are reused for other encryption operations. This is advantageous since the bit string R is not used up in this manner and does not have to be replaced after a particular number of encryption operations which have been carried out.

According to embodiments, each section of the bit strings $A_{i,j}$ is used only once for encryption, with the result that the bit strings have to be replaced after a particular number of encryption operations which have been carried out. With this opportunity, new pointers $a_j$ and $r_i$ and a new bit string R are preferably also stored on the storage medium.

According to embodiments of the invention, the computer program product is designed to receive a twice-encrypted third set of data, to decrypt said third set of data with the aid of the first set of data and to store said third set of data in the memory. This is advantageous if a twice-encrypted set of data is received by a computer program product according to the invention from another communication partner. This set of data can be decrypted according to the invention with the aid of the first set of data and can be stored in the memory. The decryption is preferably effected using the bit strings $A_{i,j}$ and R and the pointers $a_j$ and $r_i$ according to the AES method or XOR method.

BRIEF DESCRIPTION OF THE FIGURES

Embodiments of the invention are explained in more detail below with reference to the drawings, in which.

Elements in the following figures which correspond to one another are identified using the same reference symbols.

DETAILED DESCRIPTION OF ILLUSTRATIVE EMBODIMENTS

Figure 1:
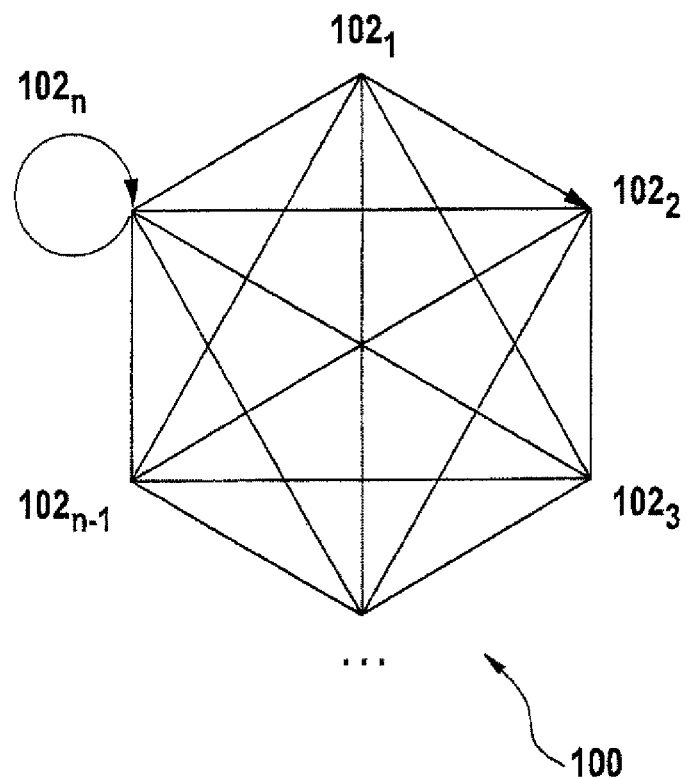
FIG. 1 shows a diagrammatic illustration of a network comprising n apparatuses according to the invention.

FIG. 1 shows a diagrammatic view of a network 100 having a plurality of apparatuses according to the invention $102_1$-$102_n$. Each apparatus according to the invention $102_i$ is connected to every other apparatus according to the invention $102_j$ in the network 100. Each apparatus according to the invention $102_i$ in the network 100 can communicate with any other apparatus according to the invention $102_j$ in the network 100. The apparatus according to the invention $102_n$ also has a memory for storing data, which were encrypted by the apparatus $102_n$, in the memory. The data can be decrypted again by the apparatus $102_n$ at a later point in time.

Figure 2:
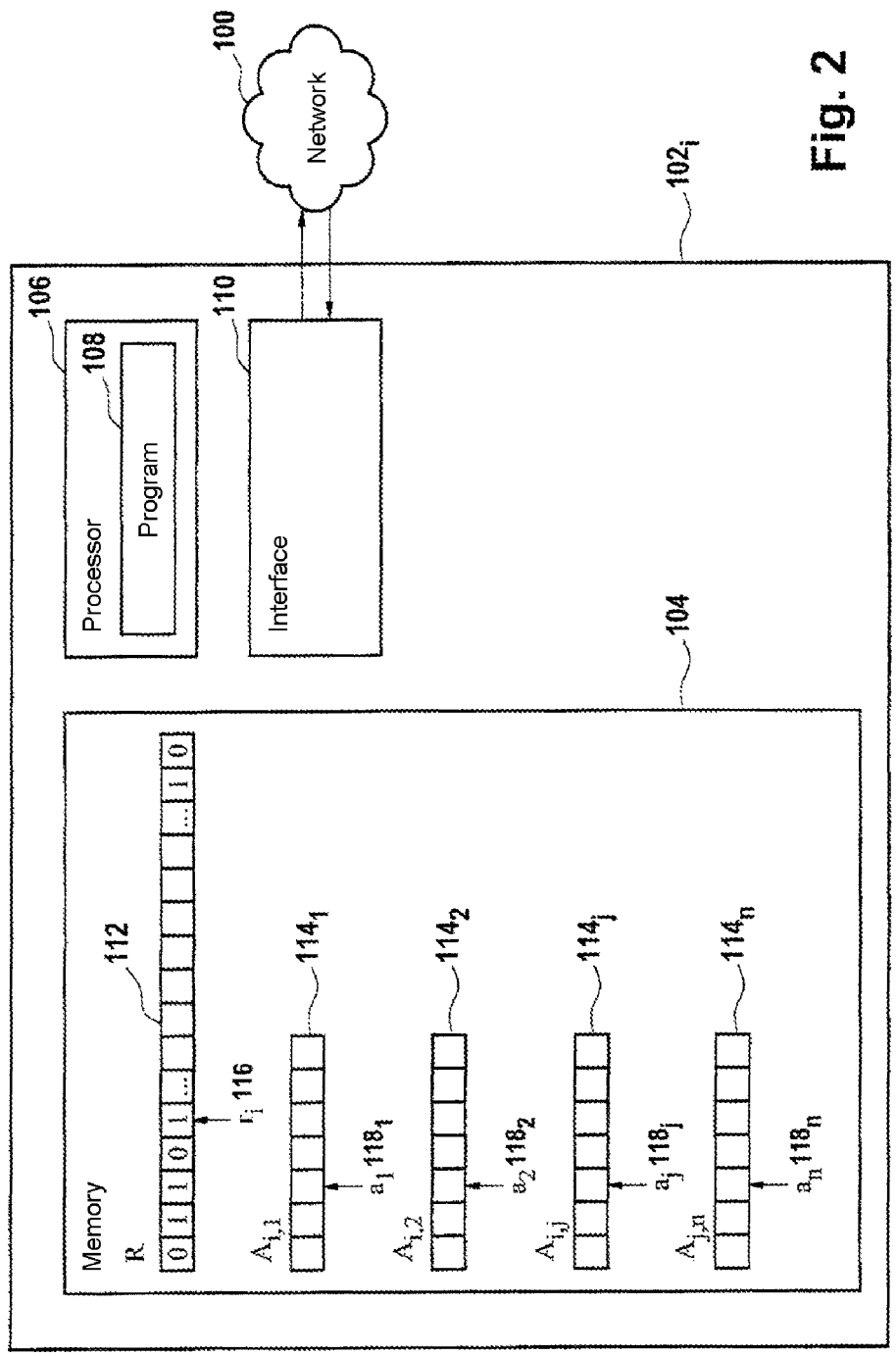
FIG. 2 shows a diagrammatic illustration of an apparatus according to the invention.

FIG. 2 shows a block diagram of an apparatus according to the invention $102_i$. The apparatus according to the invention $102_i$ has a memory 104, a processor 106, an executable program 108 and an interface 110. The bit strings R 112, the bit strings $A_{i,1}$ $114_1$ to $A_{j,n}$ $114_n$ and the respective associated pointers $r_i$ 116 and $a_1$ $118_1$ to $a_n$ $118_n$ are stored in the memory.

According to the invention, the pointer $a_1$ $118_1$ points to a place in the bit string $A_{i,1}$ $114_1$, the pointer $a_2$ $118_2$ points to a place in the bit string $A_{i,2}$ $114_2$, the pointer $a_j$ $118_j$ points to a place in the bit string $A_{i,j}$ $114_j$ and the pointer $a_n$ $118_n$ points to a place in the bit string $A_{j,n}$ $114_n$. The pointer $r_1$ 116 points to a place in the bit string R 112. The processor 106 is designed to execute a program 108. The program 108 can encrypt and decrypt data with the aid of the bit strings R 112 and $A_{i,1}$ $114_1$ to $A_{j,n}$ $114_n$ and the associated pointers $r_i$ 116 and $a_1$ $118_1$ to $a_n$ $118_n$. The encrypted data can be transmitted, via the interface 110, to a network 100 in which the recipient is located. Data to be decrypted can be received from the network 100 via the interface 110.

During operation, data are encrypted and decrypted by the apparatus according to the invention $102_i$. For this purpose, the data are first of all symmetrically encrypted with the aid of the appropriate bit string $A_{i,j}$ $114_j$ and the associated pointer $a_j$ $118_j$ if they are intended to be transmitted to the recipient $102_j$. This encryption can be carried out with the aid of the AES method by creating the key from the bit string $A_{i,j}$ $114_j$. The pointer $a_j$ $118_j$ indicates the place in the bit string $A_{i,j}$ $114_j$ at which the key is intended to begin. The length of the key must be predefined and must be known to the communication partner $102_j$. The symmetrically encrypted data are encrypted again using the bit string R 112 and the pointer $r_i$ 116 according to the XOR method. Both encryption operations are carried out by the program 108 which can be executed by the processor 106. The encrypted data are transmitted, via the interface 110, to the network 100 in which the communication partner $102_j$ is located.

Figure 3:
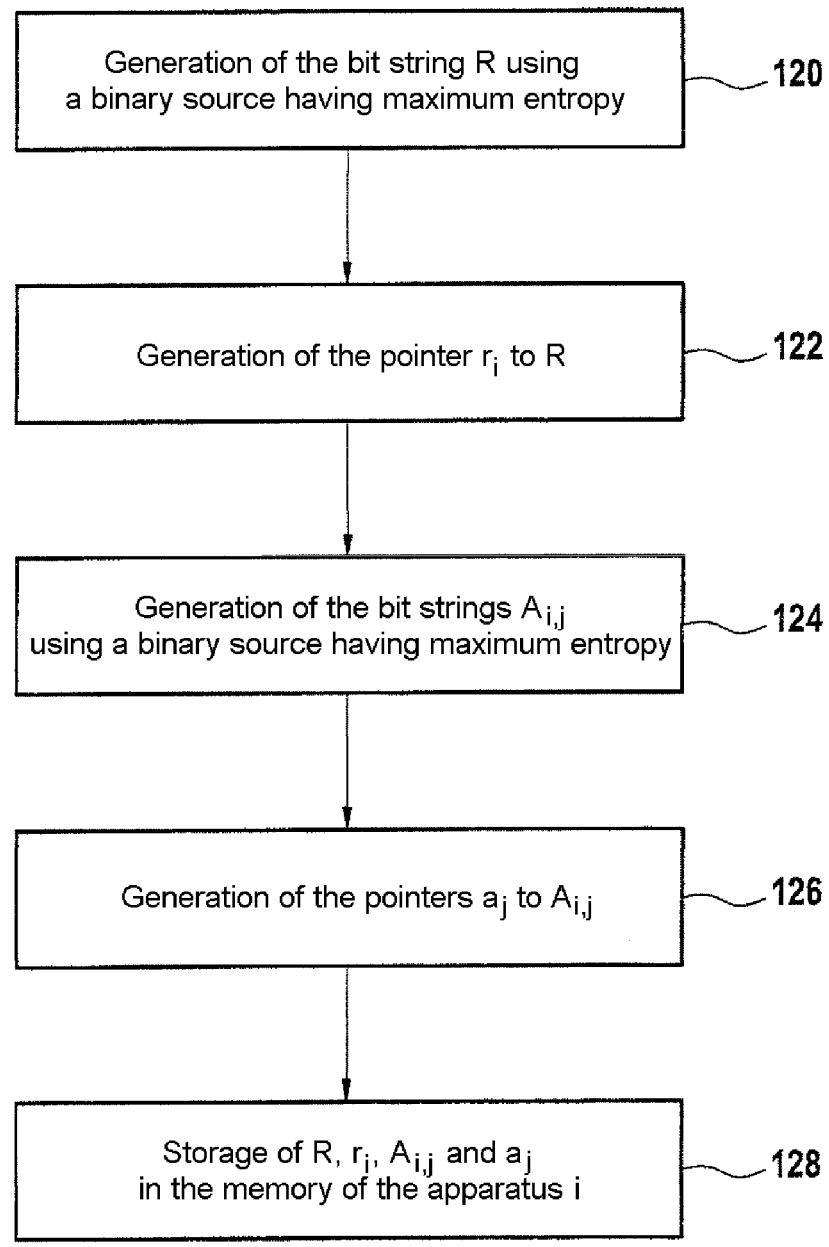
FIG. 3 shows a block diagram of the generation of the first set of data.

FIG. 3 shows a block diagram which describes the creation of the bit strings $A_{i,j}$ $114_j$ and R 112 as well as the associated pointers $a_j$ $118_j$ and $r_i$ 116 using a random number generator. A bit string R is first of all generated 120 in the random number generator. This is effected using a binary source having maximum entropy, for example a Geiger counter which is fitted close to a radioactive source and generates one bit in the bit string at particular intervals of time; it generates a 1 if radioactive decay was detected in said period of time and generates a 0 if no radioactive decay was detected in said period of time. Since, in order to encrypt a message with the aid of the exclusive OR method using R, a key having the same length as the message to be encrypted is required, it is necessary for R to have a sufficient length. In principle, any quantum mechanical process is a process having maximum entropy since it is not possible to predict the results.

After the bit string R having maximum entropy has been generated, the pointer $r_i$ to R is generated 122. $r_i$ indicates the place in the bit string R at which the key which is used for encryption according to the XOR method begins.

The bit strings $A_{i,j}$ are then generated 124 using the binary source having maximum entropy. The bit strings $A_{i,j}$ are subsequently used by the apparatus for the symmetrical encryption, for example according to the AES method. Keys with a length of 256 bits are usually used for this method. The bit strings $A_{i,j}$ therefore usually have a shorter length than the bit string R.

In the following step 126, the pointers $a_j$ to $A_{i,j}$ are generated. This can be effected by the random number generator or by a computer. Each pointer $a_j$ points to a particular bit in the associated bit string $A_{i,j}$. This is the first bit which is used to obtain the key used for the first encryption operation. n−1 different $A_{i,j}$ and n−1 $a_j$ are required for communication between a plurality of apparatuses according to the invention. Embodiments of the apparatuses according to the invention have means for symmetrically encrypting data according to the invention and for encrypting data according to the XOR method. These embodiments require n different $A_{i,j}$ and n $a_j$.

R, $r_i$, $A_{i,j}$ and $a_j$ are then stored 128 in the memory of the apparatus i.

Figure 4:
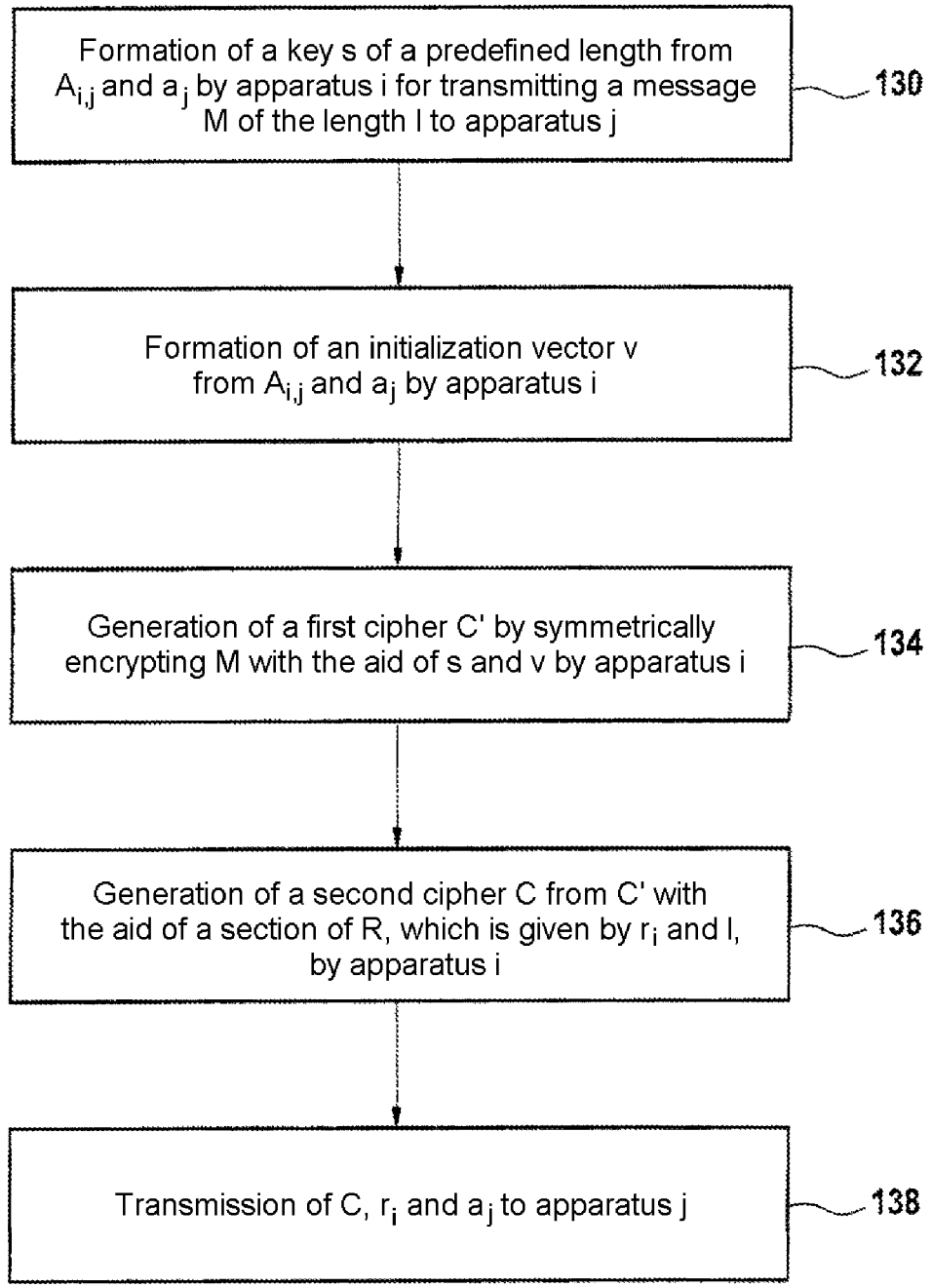
FIG. 4 shows a block diagram of the encryption of data.

FIG. 4 shows a block diagram of the process of encrypting a message M of the length l, which is intended to be transmitted to the apparatus j, in the apparatus i. In the first step 130, a key s which is given by a predefined length is formed from $a_j$ and $A_{i,j}$. The key s consists of a section of the bit string $A_{i,j}$ which begins at the bit to which the pointer $a_j$ points. The length of the key is predefined and is usually 256 bits.

An initialization vector v which is required for the symmetrical encryption according to the AES method, for example, is then formed 132 from $A_{i,j}$ and $a_j$ by the apparatus i. The initialization vector v begins directly at that bit in the bit string $A_{i,j}$ which follows the bit which was last used to form the key s. The length of the initialization vector is usually half the key length.

In step 134, the apparatus i generates a first cipher C' by symmetrically encrypting the message M with the aid of the key s and the initialization vector v. This symmetrical encryption is preferably carried out according to the AES method.

In the next step 136, the apparatus i generates a second cipher C from C'. This is effected with the aid of a section of the bit string R which is given by $r_i$ and l. This encryption is carried out according to the XOR (exclusive OR) method. For this purpose, the key length must correspond to the length l of the message M. As a result of the pointer $r_i$ which points to a particular bit in the bit string R, the key is thus defined by virtue of the fact that the length l of the key is defined from the outset by the length l of the message M.

The second cipher C and the pointers $r_i$ and $a_j$ are then transmitted 138 to the apparatus j.

Figure 5:
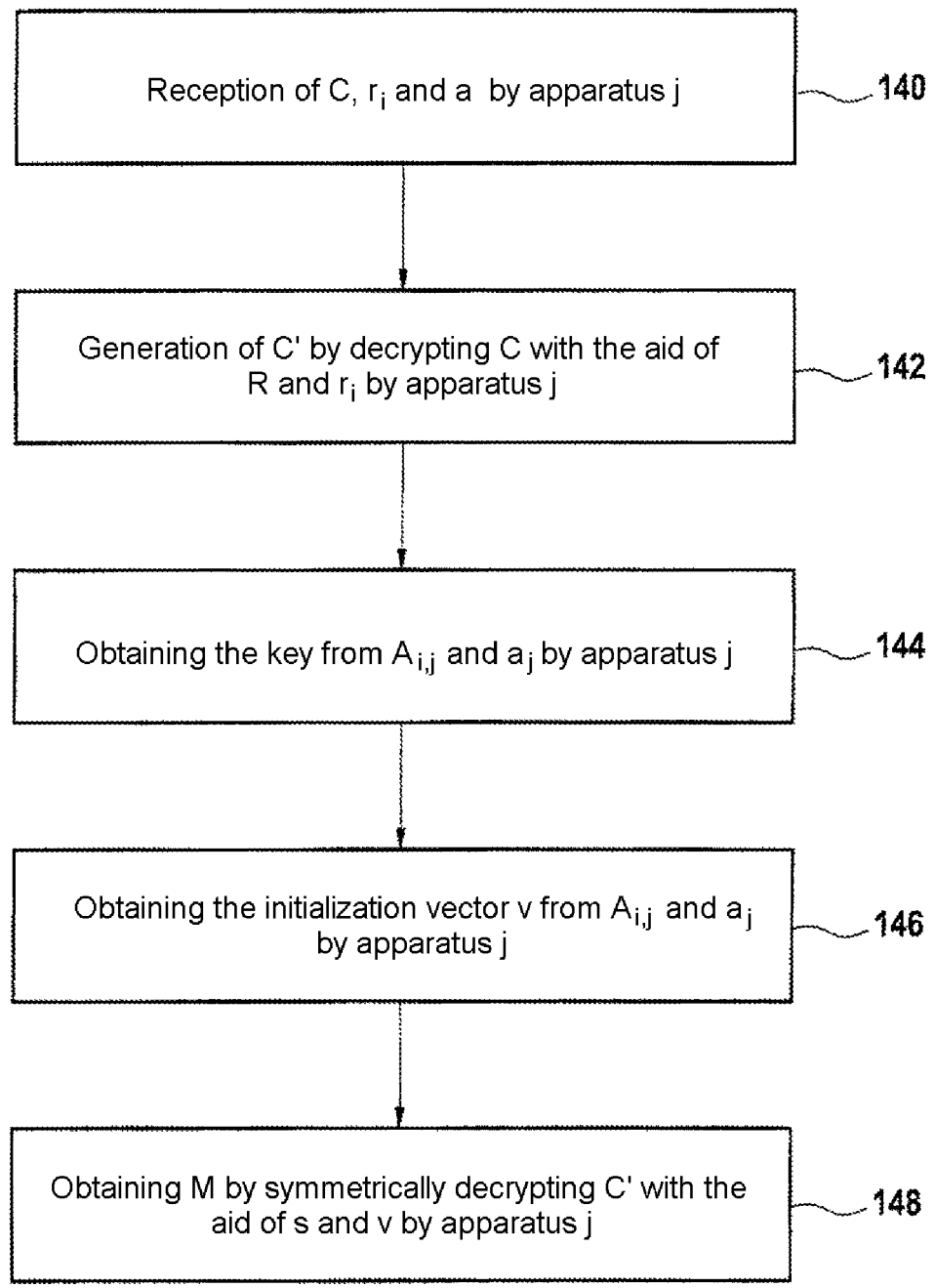
FIG. 5 shows a block diagram of the reception and the decryption of encrypted data.

FIG. 5 shows a block diagram of the decryption of a message M by the apparatus j, which message was received from an apparatus i. The apparatus j receives 140 the double-encrypted cipher C, the pointer $r_i$ to R and the pointer $a_j$ to $A_{i,j}$ from the apparatus i. The bit strings R and $A_{i,j}$ are already stored in the apparatus j.

In step 142, the cipher C' is generated by decrypting C with the aid of the bit string R and the pointer $r_i$. This is carried out in precisely the same manner as the encryption by the XOR method. The length of the required key results from the length of the cipher C. The key required for decryption consists of a section of the bit string R which begins at the bit to which the pointer $r_i$ points and the length of which corresponds to the length l of the cipher C.

After the cipher C' has been generated by the apparatus j, the key is obtained from the bit string $A_{i,j}$ and the pointer $a_j$ by the apparatus j in step 144. The key begins at that bit in the bit string $A_{i,j}$ to which the pointer $a_j$ points and has a predefined length, preferably 256 bits. The cipher C' is thus decrypted using the same key as that which was previously used by the apparatus i to encrypt the cipher in FIG. 4.

The apparatus j then obtains 146 the initialization vector v from the bit string $A_{i,j}$ and the pointer $a_j$. The initialization vector v begins at the bit which follows the bit which was last used for the key s. The length of the initialization vector v is also predefined and is usually half the length of the key used. The same initialization vector v as was used for encryption by the apparatus i in FIG. 4 is thus used for decryption.

In step 148, the message M is then obtained by the apparatus j by symmetrically decrypting C' with the aid of the key s and the initialization vector v. This is preferably carried out according to the AES method. The key s and the initialization vector v were obtained from the bit string $A_{i,j}$ with the aid of the pointer $a_j$ and are identical to the key s used for encryption and the initialization vector v used for encryption.

Figure 6:
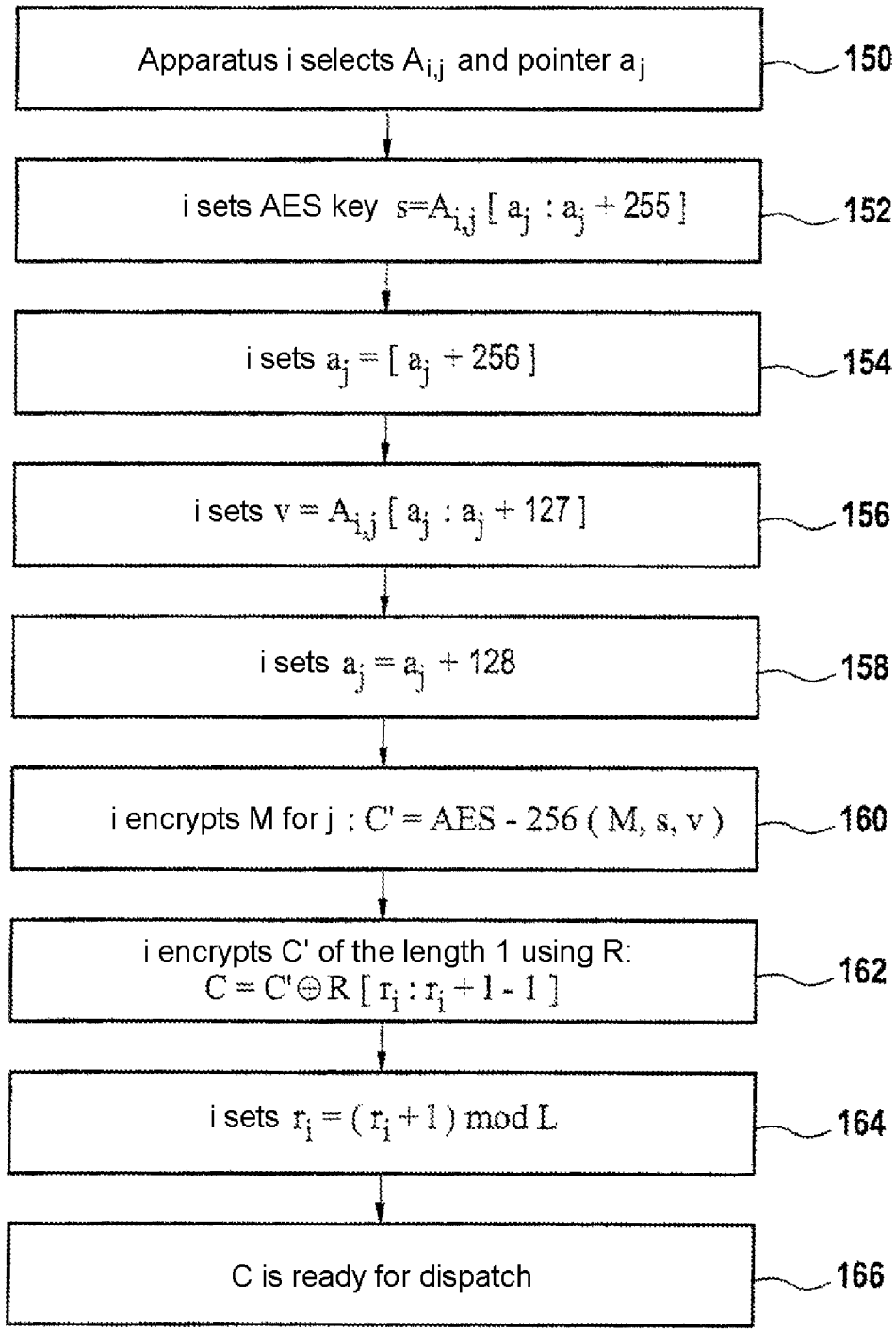
FIG. 6 shows a block diagram of the encryption of a message.

FIG. 6 shows a block diagram of the process of encryption according to the invention. In order to encrypt a message M which is intended to be transmitted to the apparatus j, the apparatus i selects 150 the bit string $A_{i,j}$ and the pointer $a_j$.

In step 152, the apparatus i sets an AES key s:

$$s = A_{i,j} \lfloor a_j : a_j + 255 \rfloor$$

In this case, the key s consists of 256 bits and begins at that bit in the bit string $A_{i,j}$ to which the pointer a; points. The length of 256 bits is predefined and is known to the apparatus j to which the message M is transmitted. The apparatus i no longer continues to use that section of the bit string $A_{i,j}$ which was used to obtain the key s in future encryption operations. Each section of the bit string $A_{i,j}$ is thus used a maximum of two times, once when encrypting a message which is intended to be transmitted to j by i and a second time when encrypting a message which is intended to be transmitted to i by j.

Since the originally selected pointer $a_j$ did not necessarily point to the first bit in the bit string $A_{i,j}$, the interval is continued at the start of the bit string $A_{i,j}$ for the purpose of obtaining the key upon reaching the end of the bit string $A_{i,j}$ if the start has not yet been used for encryption.

The apparatus i then selects 154 a new pointer $a_j$:

$$a_j = a_j + 256$$

In step 156, the apparatus i selects the initialization vector v required for encryption according to the AES method:

$$v = A_{i,j} \lfloor a_j : a_j + 127 \rfloor$$

The initialization vector v is thus half as long as the AES key s and begins with the bit which was the first to no longer be used to obtain the key s.

For future encryption of a message for the apparatus j, the pointer $a_j$ is advanced 158 to the bit which is the first to have not yet been used to obtain the key or the initialization vector v:

$$a_j = a_j + 128$$

In step 160, i encrypts the message M intended for j with the aid of the key s and the initialization vector v according to the AES method and thus obtains a first cipher C':

$$C' = AES\text{-}256(M, s, v)$$

C' is then encrypted 162 by i according to the XOR method using the bit string R. The key obtained from R begins at that bit in the bit string R to which the pointer $r_i$ points and has the length l which corresponds to the length of the cipher C'. The result C is thus a double-encrypted message:

$$C = C' \oplus R[r_i : r_i + l - 1]$$

A new pointer $r_i$ is then selected 164. It points to the bit which was the first to no longer be used to encrypt the message. The apparatus i is designed to reuse a part of the section of the bit string R which was used for encryption for different encryption operations. Alternatively, it is also possible for each section of R to be used only once for encryption and to then be used up. In both cases, it is advantageous if the pointer $r_i$ is reset to the start after reaching the end of the bit string R. If each section of R is used only once, this is advantageous because the pointer $r_i$ does not necessarily have to be at the start of the bit string during the first encryption operation. This can be achieved by using modulo:

$$r_i = (r_i + l) \bmod L$$

L is the length of the bit string R and l is the length of the section of R used for encrypting. According to the above formula, $r_i$ is set to the start of R when $r_i$ has reached the end of R.

The double-encrypted message C is then ready for dispatch to j 166.

Figure 7:
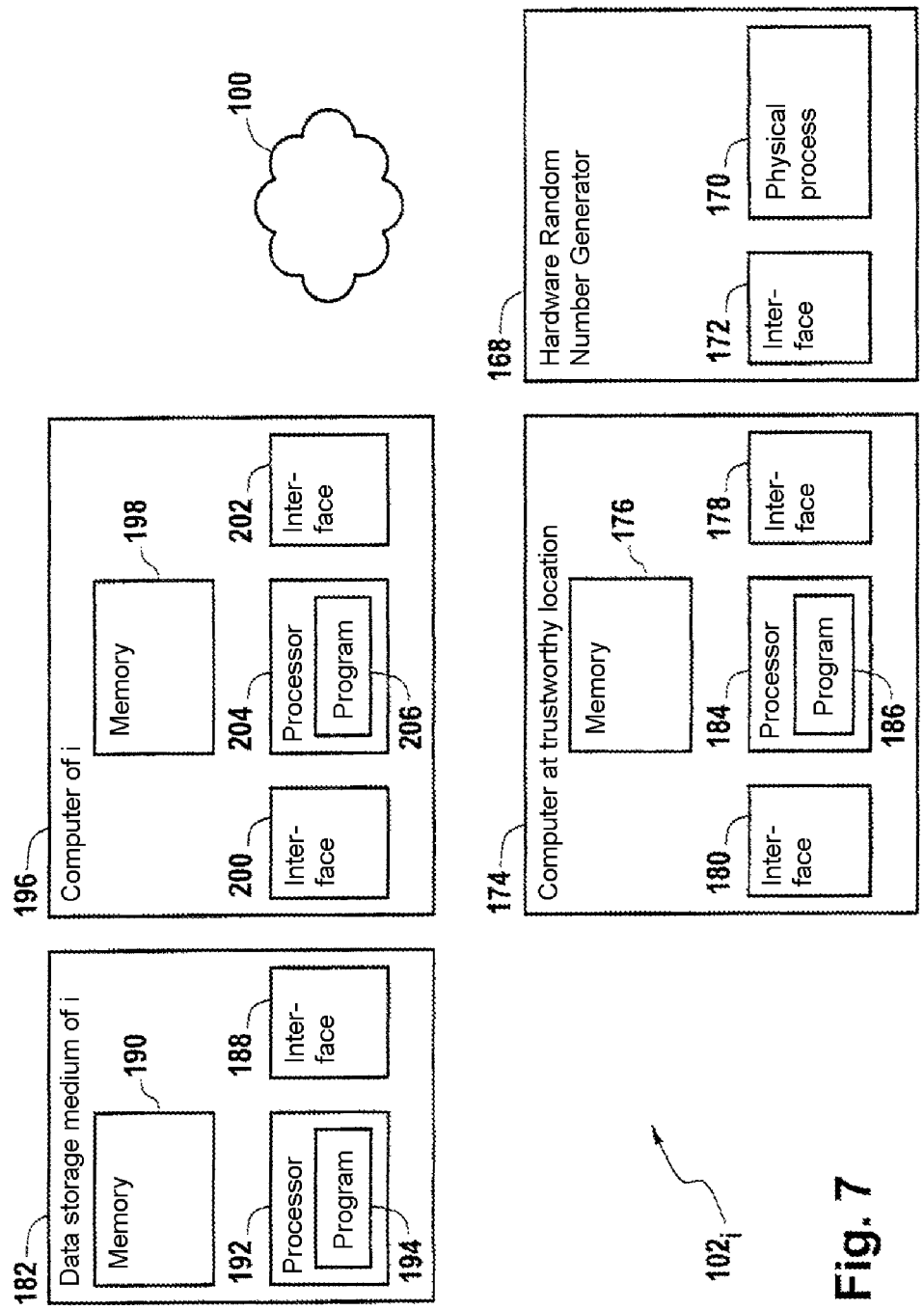
FIG. 7 shows a block diagram of an apparatus according to the invention having a random number generator.

FIG. 7 shows a diagrammatic illustration of an apparatus according to the invention $102_i$. A physical process having maximum entropy 170 runs in a random number generator 168 (hardware random number generator). The random number generator 168 also has an interface 172 for communicating with a computer 174 located at a trustworthy location. The computer 174 has a memory 176, an interface 178 for communicating with the random number generator 168, a second interface 180 for communicating with the data storage medium 182 and a processor 184 which is designed to execute a program 186. The program 186 is designed to read the bit string from the random number generator 168, to store said bit string in the memory 176 and to output said bit string to the data storage medium 182 via the interface 180.

The data storage medium 182 has an interface 188 for communicating with different computers. The data storage medium 182 also contains a memory 190 and a processor 192 which is designed to execute the program 194. The program 194 is designed to encrypt data received via the interface 188, to store said data in the memory and to decrypt said data.

The apparatus also has a computer 196 having a memory 198, two interfaces 200 and 202 and a processor 204. The processor 204 is designed to execute a program 206. The interface 200 is used to communicate with the data storage medium 182. The interface 202 is used to communicate with the network 100. The program 206 is designed to receive data from the network 100, to decrypt said data and to store said data. The program is also designed to double-encrypt data according to the invention and to transmit said data to another apparatus according to the invention in the network 100. The program 206 is also designed to read the memory 190 of the data storage medium 182 and to decrypt the memory after a user has input a password.

During operation, the random number generator 168 first of all generates a bit string having maximum entropy by means of the physical process 170. This may be radioactive decay, for example. The program 186 which can be executed by the processor 184 reads the bit string via the interfaces 172 and 178 of the computer 174 and of the random number generator 168 and stores this bit string in the memory 176.

According to the invention, the bit strings generated are the bit strings $A_{i,j}$ and R. For the bit string $A_{i,j}$ a pointer $a_j$ is generated by the program 186 and is stored in the memory; for the bit string R, a pointer $r_i$ is generated by the program 186 and is stored in the memory 176. The bit string $A_{i,j}$ is usually shorter than the bit string R since the bit string $A_{i,j}$ is used for a symmetrical encryption method according to the AES method and the bit string R is used for encryption according to the XOR method. Encryption according to the XOR method requires a key whose length corresponds to the length of the messages, whereas encryption according to the AES method requires a key of a predefined length, preferably 256 bits. The data storage medium 182 is connected to the computer 174 via the interfaces 188 and 180. The program 186 transmits the bit strings and pointers from the memory 176 to the data storage medium 182. The processor 193 of the data storage medium 182 executes the program 194 which stores the received data in encrypted form in the memory 190. The data storage medium 182 is then connected to the computer 196 via interfaces 188 and 200. The program 206 executed by the processor 204 reads the memory 190 of the data storage medium 182 and stores the bit strings $A_{i,j}$ and R as well as the pointers $a_j$ and $r_i$ in the memory 198 after the user has input a password. The apparatus $102_i$ is now ready to encrypt data according to the invention. The data are first of all symmetrically encrypted with the aid of the program 206 executed by the processor 204 and the bit string $A_{i,j}$ and the pointer $a_j$ according to the AES method. The symmetrically encrypted data are then encrypted according to the XOR method using a key obtained from the bit string R with the aid of the pointer $r_i$. This step makes it possible to transmit the data to a recipient through the untrustworthy network 100 without the risk of the data being able to be decrypted in the future. So that the recipient can successfully decrypt the message, the apparatus $102_i$ concomitantly transmits the pointer $r_i$ used and the pointer $a_j$ used with the double-encrypted message. The recipient already has the bit strings $A_{i,j}$ and R.

LIST OF REFERENCE SYMBOLS

100 Network
$102_{1-n}$ Apparatus 1-n
104 Memory
106 Processor
108 Program
110 Interface
112 Bit string R
$114_{1-n}$ Bit string $A_{i1-n}$
116 Pointer $r_i$
$118_{1-n}$ Pointer $a_{1-n}$
120 Generation of R
122 Generation of $r_i$
124 Generation of $A_{i,j}$
126 Generation of $a_j$
128 Storage of R, $r_i$, $A_{i,j}$ and $a_j$
130 Formation of the key s
132 Formation of the initialization vector v
134 Generation of the cipher C'
136 Generation of the cipher C
138 Transmission of C, $r_i$, $a_j$
140 Reception of C, $r_i$, $a_j$
142 Generation of C'
144 Obtaining the key s
146 Obtaining the initialization vector v
148 Obtaining the message M
150 Selection of the bit string $A_{i,j}$ and the pointer $a_j$
152 Setting of the key s
154 Setting of the pointer $a_j$
156 Setting of the initialization vector v
158 Setting of the pointer $a_j$
160 Encryption according to the AES method
162 Encryption according to the XOR method
164 Setting of the pointer $r_i$
166 C ready for dispatch
168 Random number generator
170 Physical process
172 Interface
174 Trustworthy PC
176 Memory
178 Interface
180 Interface
182 Date storage medium
184 Processor
186 Program
188 Interface
190 Memory
192 Processor
194 Program
196 Computer
198 Memory
200 Interface
202 Interface
204 Processor
206 Program

What is claimed is:

1. A non-transitory computer readable medium for encrypted communication via a transmission medium, the computer readable medium encoded with instructions, the instructions capable of execution on a computer, the instructions comprising the following steps:
   reading a second set of data from a memory;
   symmetrically encrypting the second set of data with the aid of a first set of data from the memory, the first set of data including a first bit string generated by a hardware random number generator, the first bit string being random;
   encrypting the symmetrically encrypted second set of data according to a different symmetrical encryption with the aid of a second bit string,
   the second bit string being random and generated by physical process that comprises a quantum process, the quantum process comprising radioactive decay, thermal noise, or other process with physical quantum effects;
   a section of the second bit string being used for encryption, wherein the section is at least some subset of the second bit string; and
   successive encryption operations being carried out with varying sections of the second bit string, wherein the second bit string is used up and is no longer used for encryption operations once every section of the second bit string has been used up.

2. The computer readable medium according to claim 1, wherein the instructions also include the following steps:
   receiving a twice-encrypted third set of data;
   decrypting said third set of data with the aid of the first set of data; and storing said third set of data in the memory.

3. The computer readable medium according to claim 1, wherein the instructions also include the following steps:
   implementing a pointer to point to a beginning of the section of the second bit string;
   initializing the pointer to point to a random section of the second bit string; and setting the pointer to point to an earlier, unused section of the second bit string upon reaching the end of the second bit string.

* * * * *